(12) United States Patent
Nam et al.

(10) Patent No.: US 10,466,819 B2
(45) Date of Patent: Nov. 5, 2019

(54) FLEXIBLE DISPLAY DEVICE

(71) Applicant: Samsung Display Co., Ltd., Yongin (KR)

(72) Inventors: Seung Wook Nam, Cheonan-si (KR); Kyu Young Kim, Suwon-si (KR); Ah Young Kim, Gunpo-si (KR); Gui-Nam Min, Hwaseong-si (KR); Kyu-Taek Lee, Cheonan-si (KR); Ji Hyuk Im, Seoul (KR); Yong Cheol Jeong, Yongin-si (KR); So Yeon Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 620 days.

(21) Appl. No.: 14/532,643

(22) Filed: Nov. 4, 2014

(65) Prior Publication Data

US 2015/0363030 A1 Dec. 17, 2015

(30) Foreign Application Priority Data

Jun. 17, 2014 (KR) .......................... 10-2014-0073799

(51) Int. Cl.
*G06F 3/041* (2006.01)
*G06F 1/16* (2006.01)
(Continued)

(52) U.S. Cl.
CPC .............. *G06F 3/0412* (2013.01); *B32B 5/00* (2013.01); *G06F 1/1652* (2013.01); *G06F 3/041* (2013.01); *B32B 2457/20* (2013.01); *G02F 1/133305* (2013.01); *G06F 2203/04102* (2013.01); *Y10T 428/10* (2015.01); *Y10T 428/1036* (2015.01); *Y10T 428/1086* (2015.01)

(58) Field of Classification Search
CPC ................... G06F 3/041; G06F 3/0412; G06F 2203/04102; G06F 1/133305; B32B 5/00; B32B 2457/20; Y10T 428/10; Y10T 428/1036; Y10T 428/1086
See application file for complete search history.

(56) References Cited

U.S. PATENT DOCUMENTS

2009/0004478 A1* 1/2009 Baetzold .............. C08G 18/672
428/412
2010/0295812 A1* 11/2010 Burns ................... G06F 3/0412
345/174

(Continued)

FOREIGN PATENT DOCUMENTS

JP 2004140029 5/2004
JP 2011181621 9/2011
(Continued)

*Primary Examiner* — Anthony J Frost
(74) *Attorney, Agent, or Firm* — H.C. Park & Associates, PLC

(57) ABSTRACT

A flexible display device including: a flexible display panel displaying an image; a touch sensing layer provided on the flexible display panel; and a window provided on the touch sensing layer and including a flat area and a bending area. The window includes a flexible film and a hard coating film provided on the flexible film, the thicknesses of the flexible film in the flat area and the bending area differ, and the thicknesses of the hard coating film in the flat area and the bending area also differ.

17 Claims, 5 Drawing Sheets

(51) Int. Cl.
*B32B 5/00* (2006.01)
*G02F 1/1333* (2006.01)

(56) References Cited

U.S. PATENT DOCUMENTS

2012/0256720 A1* 10/2012 Byun .................... H01C 10/10
338/2
2013/0034685 A1 2/2013 An et al.
2013/0169515 A1* 7/2013 Prushinskiy .......... G06F 1/1652
345/55

FOREIGN PATENT DOCUMENTS

KR 1020110052759 5/2011
KR 1020130076402 7/2013

* cited by examiner

FLEXIBLE DISPLAY DEVICE

CROSS-REFERENCE TO RELATED APPLICATION

This application claims priority from and the benefit of Korean Patent Application No. 10-2014-0073799, filed on Jun. 17, 2014, which is hereby incorporated by reference for all purposes as if fully set forth herein.

BACKGROUND

Field

Exemplary embodiments relate to a flexible display device.

Discussion of the Background

Recently, a flexible display device that can be bent has been used in display devices displaying an image.

The flexible display device includes a window that protects the display device from external impact, and such a window should also exhibit flexibility.

In order to permit sufficient flexibility, the window may be formed of a flexible film made of a plastic material, thereby reducing the durability of the window.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a flexible display device including a window having flexibility in addition to excellent durability.

Additional aspects will be set forth in the detailed description which follows, and, in part, will be apparent from the disclosure, or may be learned by practice of the inventive concept.

An exemplary embodiment of the present invention includes: a flexible display panel for displaying an image; a touch sensing layer provided on the flexible display panel; and a window provided on the touch sensing layer and including a flat area and a bending area. The window includes a flexible film and a hard coating film provided on the flexible film. The thickness of the flexible film in the flat area differs from that in the bending area, and the thickness of the hard coating film in the flat area differs from that in the bending area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
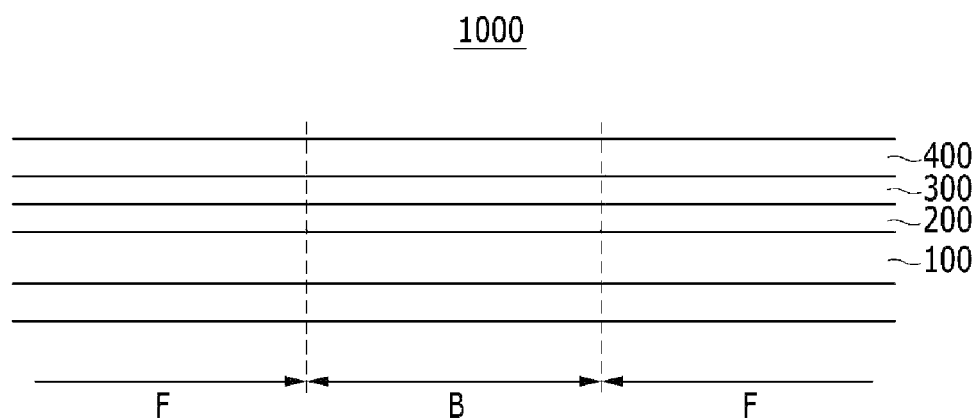
FIG. 1 is a schematic cross-sectional view of a flexible display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
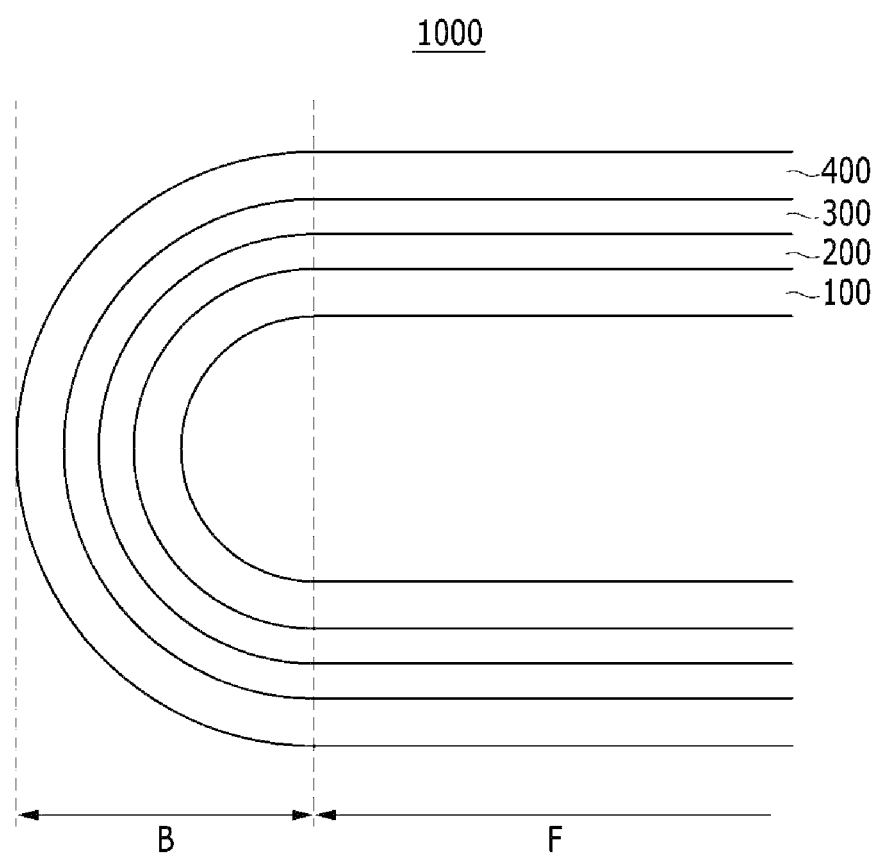
FIG. 2 is a schematic cross-sectional view of the flexible display device in a bent state according to the exemplary embodiment.

FIG. 1 is a schematic cross-sectional view of a flexible display device 1000 according to an exemplary embodiment. FIG. 2 is a cross-sectional view of the flexible display device 1000 in a bent state.

Referring to FIG. 1 and FIG. 2, the flexible display device 1000 includes a flexible display 100 displaying an image, a touch sensing layer 200, a polarizer 300, and a window 400. The flexible display device 1000 includes flat areas F and a bending area B.

The flexible display panel 100 includes pixels that display a processed image. For example, when the flexible display device 1000 is a mobile terminal, the flexible display panel 100 may display an image such as a user interface (UI) or a graphic user interface (GUI) related to a call.

The flexible display panel 100 includes a flexible substrate made of a plastic material having excellent heat resistance and durability, such as polyethylene naphthalate (PEN), polycarbonate (PC), polyarylate (PAR), polyether imide (PEI), polyether sulfone (PES), polyimide (PI), and poly(methylmethacrylate) (PMMA). Alternatively, the flexible display panel 100 may include a flexible substrate made of a variety of flexible materials.

The flexible display panel 100 may include a flexible substrate where thin film transistors, gate lines, data lines, and pixel electrodes are arranged, a flexible substrate where color filters and a common electrode are arranged, and a liquid crystal layer provided between the two flexible substrates.

In addition, the flexible display panel 100 may include a flexible substrate where thin film transistors, gate lines, data lines, pixel electrodes, and a common electrode are arranged. In this case, microcavities are respectively formed between the pixel electrodes and the common electrode, and a liquid crystal layer may be formed in each microcavity.

The flexible display panel 100 may include thin film transistors, gate lines, data lines, and organic light emitting diodes arranged on the flexible substrate.

The touch sensing layer 200 is disposed on the flexible display panel 100. When an object closely approaches or contacts the touch sensing layer 200, the touch sensing layer 200 senses touch. Here, "contact" may include a case in which an external object, such as a user's hand, directly contacts the touch sensing layer 200, and a case in which the external object approaches the touch sensing layer 200 or hovers while close to the touch sensing layer 200.

In the present exemplary embodiment, the touch sensing layer 200 is disposed, for example, on the flexible display panel 100. The touch sensing layer 200 may instead be provided in the flexible display panel 100. In addition, the touch sensing layer 200 may be provided on the flexible substrate and thus, attached thereto. Alternatively, the touch sensing layer 200 may be provided in the window 400.

The polarizer 300 may be provided on the touch sensing layer 200. The polarizer 300 may increase the contrast ratio by reducing reflection of external light.

The window 400 is provided on the polarizer 300, and protects the flexible display panel 100 and the touch sensing layer 200 from external force and contamination.

In addition, an adhesive layer may be used to attach the window 400 to the polarizer 300.

In addition, a barrier layer may be provided in the bottom surface of the flexible display panel 100 to absorb external impact, thereby preventing damage to the flexible display panel 100 and the touch sensing layer 200 as a result of the external impact. In this case, the barrier layer may be made of a material containing air, such as a cushion or a sponge, to absorb impacts. In addition, the barrier layer may attach the flexible display panel 100 to other parts, for example, a case, and in this case, the barrier layer may include an adhesive layer so as to be attached to the other part.

Such a flexible display device 1000 has flexibility and, as shown in FIG. 2, may be bent. In this case, the flexible display device 1000 is bent in the bending area B.

The window 400 is made of a flexible film made of a plastic material for realization of flexibility, and the plastic material is less durable than glass such that there is a need for improved durability of the window 400. The durability of the flexible film can be improved by increasing the thickness of the flexible film, but in this case, bending stiffness is increased, thereby reducing flexibility of the flexible film. Here, the bending stiffness refers to a force of recovery after bending (resiliency).

Figure 3:
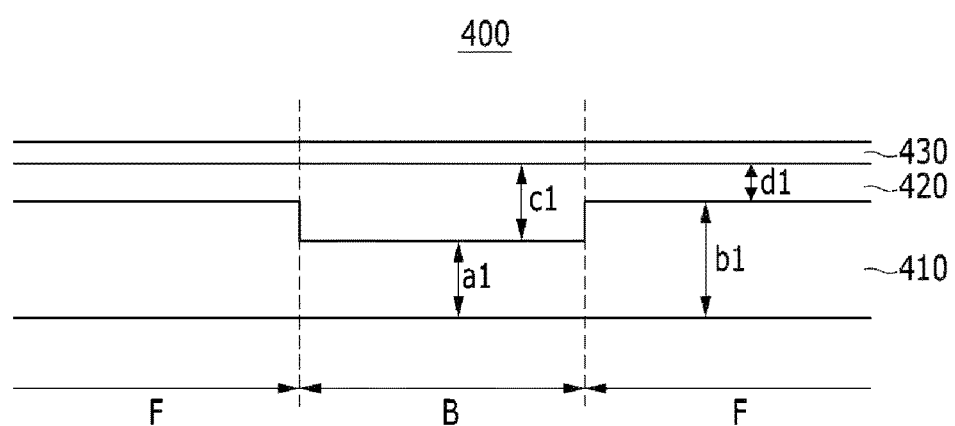
FIG. 3 is a schematic view of a cross-section of a window according to the exemplary embodiment.

FIG. 3 schematically shows a cross-section of the window according to the exemplary embodiment.

Referring to FIG. 3, the window 400 includes a flexible film 410, a hard coating film 420, and a functional film 430 that are sequentially layered.

The flexible film 410 may be made of a plastic film, such as polyethylene terephthalate (PEF), polycarbonate (PC), polyimide (PI), or poly(methylmethacrylate) (PMMA).

The hard coating film 420 may be made of a material such as an organic hybrid resin, an inorganic hybrid resin, or an acryl resin.

The functional film 430 may be an anti-reflection film that prevents reflection of external light, or an anti-fingerprint film that prevents a fingerprint of a user from remaining Alternatively, the functional film 430 may include both of the anti-reflection film and the anti-fingerprint film.

A tensile modulus of the flexible film 410 may be greater than that of the hard coating film 420. In addition, the thickness of the flexible film 410 differs from that of the hard coating film 420 in the bending area B and the flat area F.

When the thickness of the flexible film 410 in the bending area is $a_1$, and the thickness of the flexible film 410 in the flat area F is $b_1$, $a_1$ is smaller than $b_1$. Thickness $a_1$ may have a value of 40% to 90% of thickness $b_1$.

In addition, when the thickness of the hard coating film 420 in the bending area B is $c_1$ and the thickness of the hard coating film 420 in the flat area F is $d_1$, the thickness $c_1$ is greater than the thickness $d_1$.

Here, the sum of thicknesses $a1$ and $c1$ is equal to the sum of thicknesses $b1$ and $d1$. That is, the hard coating film 420, of which the thickness is different in the bending area B and the flat area F, is deposited to the flexible film 410, of which the thickness is different in the bending area B and the flat area F such that the flexible film 410 and the hard coating film 420 can be uniformly flat.

That is, the thickness $d1$ is 40% to 90% of the thickness $c1$. Here, the thickness $d1$ may be 10 μm to 100 μm.

As described, the window 400 includes the flexible film 410 and the hard coating film 420 so that flexibility and durability can be simultaneously improved.

Next, referring to FIG. 4, a window according to another exemplary embodiment will be described.

Figure 4:
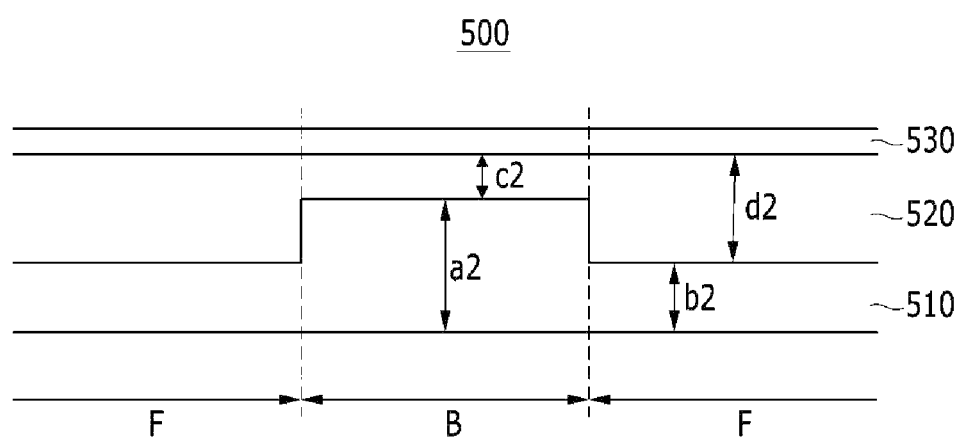
FIG. 4 is a schematic view of a cross-section of a window of another exemplary embodiment.

FIG. 4 schematically shows a cross-section of a window according to another exemplary embodiment. The window of FIG. 4 may be applied to the flexible display device of FIG. 1.

Referring to FIG. 4, a window 500 according to the present exemplary embodiment includes a flexible film 510, a hard coating film 520, and a functional film 530. The flexible film 510, the hard coating film 520, and the functional film 530 are sequentially layered.

The flexible film 510 may be made of a plastic film, such as polyethylene terephthalate (PEF), polycarbonate (PC), polyimide (PI), or poly(methylmethacrylate) (PMMA).

The hard coating film 520 may be made of a material such as an organic hybrid resin, an inorganic hybrid resin, and an acryl resin.

The function layer 530 may be an anti-reflection film, an anti-fingerprint film, or an anti-glare film.

A tensile modulus of the hard coating film 520 is greater than that of the flexible film 510. In addition, the thickness of the flexible film 510 differs from the thickness of the hard coating film 520 in a bending area B and a flat area F.

When the thickness of the flexible film 510 in the bending area is $a2$ and the thickness of the flexible film 510 in the flat area F is $b2$, $a2$ is greater than $b2$. Here, thickness $b2$ may be 40% to 90% of thickness $a2$.

In addition, when the thickness of the hard coating film 520 in the bending area B is $c2$ and the thickness of the hard coating film 520 in the flat area F is $d2$, thickness $d2$ is greater than thickness $c2$.

Here, the sum of thicknesses $a2$ and $c2$ is equal to the sum of thicknesses $b2$ and $d2$. That is, the hard coating film 520, of which the thickness is different in the bending area B and the flat area F, is deposited to the flexible film 510, of which the thickness is different in the bending area B and the flat area F, such that the flexible film 510 and the hard coating film 520 can be entirely flat.

That is, thickness $c2$ is 40% to 90% of thickness $d2$. Here, the value of $c2$ may be 10 μm to 100 μm.

As described, the window 500 includes the flexible film 510 and the hard coating film 520 so that flexibility and durability can be simultaneously improved.

Next, referring to FIG. 5, bending stiffness in a bending area of a window according to an exemplary embodiment will be described.

Figure 5:
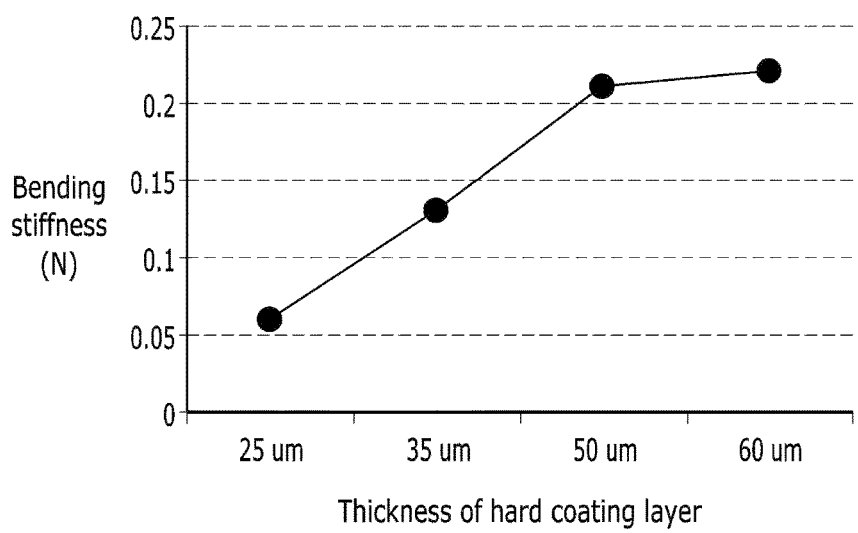
FIG. 5 is a graph illustrating a bending strength in a bending area of a window according to an exemplary embodiment.

FIG. 5 is a graph illustrating bending stiffness in the bending area of the window according to the exemplary embodiment.

In FIG. 5, the vertical axis denotes bending stiffness N, and a flexible film is formed using polyimide.

In addition, the bending stiffness is measured while changing the thickness of the hard coating film in the bending area to 25 μm, 35 μm, 50 μm, and 60 μm. In this case, the thickness of the flexible film in the bending area is fixed at 50 μm.

Referring to FIG. 5, the bending stiffness in the bending area of the window becomes lower as the thickness of the hard coating film in the bending area is reduced.

Meanwhile, when the thickness of the window formed of only polyimide is 100 μm, the bending stiffness is measured to be 0.8 N. Referring to FIG. 5, the bending stiffness in the bending area of the window is measured to be about 0.2 N when the thickness of the flexible film is 50 μm and the thickness of the hard coating film is 50 μm.

That is, when flexible film and the hard coating film both have the same thickness, that is, the thickness of the window is 100 μm, bending stiffness of the window formed of the flexible film and the hard coating film is reduced by about 75% compared to the stiffness of the window made of only polyimide.

Thus, the durability of the window formed of the flexible film and the hard coating film is improved because the window includes the hard coating film, and the thicknesses of the flexible film and the hard coating film are controlled in both the bending area and the flat area. The bending stiffness is also reduced compared to the durability of the window made of only a flexible film so that the window formed of the flexible film and the hard coating film can maintain flexibility.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A flexible display device comprising:
a flexible display panel configured to display an image;
a touch sensing layer disposed on the flexible display panel; and
a window disposed on the touch sensing layer and comprising a flat area and a bending area,
wherein:
the window further comprises a flexible film disposed on the touch sensing layer and a hard coating film directly disposed on the flexible film;
the flexible film has different thicknesses in the flat area and the bending area;
the hard coating film has different thicknesses in the flat area and the bending area;
the thicknesses of the flexible film and the hard coating film are substantially constant in each of the flat area and the bending area; and
a sum of the thicknesses of the flexible film and the hard coating film in the flat area is substantially equal to a sum of the thicknesses of the flexible film and the hard coating film in the bending area.

2. The flexible display device of claim 1, wherein a tensile modulus of the flexible film is greater than a tensile modulus of the hard coating film.

3. The flexible display device of claim 2, wherein the thickness of the flexible film in the flat area is greater than the thickness of the flexible film in the bending area.

4. The flexible display device of claim 3, wherein the thickness of the flexible film in the bending area ranges from 40% to 90% of the thickness of the flexible film in the flat area.

5. The flexible display device of claim 4, wherein the thickness of the hard coating film in the bending area is greater than the thickness of the hard coating film in the flat area.

6. The flexible display device of claim 5, wherein the thickness of the hard coating film in the flat area ranges from 40% to 90% of the thickness of the hard coating film in the bending area.

7. The flexible display device of claim 6, wherein the thickness of the hard coating film in the flat area ranges from 10 μm to 100 μm.

8. The flexible display device of claim 1, wherein a tensile modulus of the hard coating film is greater than a tensile modulus of the flexible film.

9. The flexible display device of claim 8, wherein the thickness of the flexible film in the bending area is greater than the thickness of the flexible film in the flat area.

10. The flexible display device of claim 9, wherein the thickness of the flexible film in the flat area ranges from 40% to 90% of the thickness of the flexible film in the bending area.

11. The flexible display device of claim 10, wherein the thickness of the hard coating film in the flat area is greater than the thickness of the hard coating film in the bending area.

12. The flexible display device of claim 11, wherein the thickness of the hard coating film in the bending area ranges from 40% to 90% of the thickness of the hard coating film in the flat area.

13. The flexible display device of claim 12, wherein the thickness of the hard coating film in the bending area ranges from 10 μm to 100 μm.

14. The flexible display device of claim 1, wherein the flexible film is made of a plastic film comprising at least one of polyethylene terephthalate (PEF), polycarbonate (PC), polyimide (PI), and poly(methylmethacrylate) (PMMA).

15. The flexible display device of claim 1, wherein the hard coating film comprises at least one of an organic hybrid resin, an inorganic hybrid resin, and an acryl resin.

16. The flexible display device of claim 1, wherein the window further comprises a functional film disposed on the hard coating film.

17. The flexible display device of claim 16, wherein the functional film comprises at least one of an anti-reflection film and an anti-fingerprint film.

\* \* \* \* \*